United States Patent
Hardin et al.

(10) Patent No.: US 8,075,362 B2
(45) Date of Patent: Dec. 13, 2011

(54) ELECTRONIC BANKING TOY

(75) Inventors: Mark Hardin, Redondo Beach, CA (US); Kimberly V. Matilla, Venice, CA (US); Eric Skifstrom, Manhattan Beach, CA (US); Andy Chan, Kowloon (HK)

(73) Assignee: Mattel, Inc., El Segundo, CA (US)

( * ) Notice: Subject to any disclaimer, the term of this patent is extended or adjusted under 35 U.S.C. 154(b) by 478 days.

(21) Appl. No.: 12/245,626

(22) Filed: Oct. 3, 2008

(65) Prior Publication Data

US 2009/0176432 A1 Jul. 9, 2009

Related U.S. Application Data

(60) Provisional application No. 60/977,318, filed on Oct. 3, 2007.

(51) Int. Cl.
*A45C 1/12* (2006.01)
(52) U.S. Cl. ............................. 446/8; 446/10; 446/484
(58) Field of Classification Search ............... 446/8–13, 446/175, 484; 434/107, 110
See application file for complete search history.

(56) References Cited

U.S. PATENT DOCUMENTS

| 3,940,141 | A | 2/1976 | Gybowski |
| 3,992,805 | A | 11/1976 | Arkin |
| 3,997,045 | A | 12/1976 | Yeung |
| 4,226,044 | A * | 10/1980 | Thomas ........................ 446/10 |
| 4,282,674 | A | 8/1981 | Hanson et al. |
| 4,295,036 | A | 10/1981 | Tsui |
| 4,673,368 | A | 6/1987 | Bush |
| 4,799,678 | A | 1/1989 | Terzian et al. |
| 5,465,909 | A | 11/1995 | Roth |
| 5,716,211 | A * | 2/1998 | Vetter ........................ 434/107 |
| 5,944,254 | A | 8/1999 | Liu |
| 5,976,018 | A | 11/1999 | Druckman |
| 6,227,931 | B1 * | 5/2001 | Shackelford ................ 446/268 |
| 6,364,771 | B1 | 4/2002 | Lee |
| 6,454,570 | B1 * | 9/2002 | Woods ........................ 434/107 |
| 6,461,238 | B1 | 10/2002 | Rehkemper et al. |
| 6,685,565 | B2 | 2/2004 | Tanibuchi et al. |
| 6,896,573 | B1 * | 5/2005 | Rogers ........................ 446/8 |
| 6,902,459 | B2 | 6/2005 | Kim |
| 6,976,619 | B2 | 12/2005 | Beacham et al. |
| 7,128,644 | B2 | 10/2006 | Linzey |
| 7,387,237 | B2 * | 6/2008 | Main ........................ 235/379 |
| 2002/0119744 | A1 | 8/2002 | Kwak |
| 2006/0157318 | A1 * | 7/2006 | Gao ........................ 194/344 |

(Continued)

FOREIGN PATENT DOCUMENTS

GB 2246338 1/1992

(Continued)

OTHER PUBLICATIONS

The International Bureau of WIPO; International Preliminary Report on Patentability for related application WO2009046376, dated Apr. 15, 2010.

*Primary Examiner* — Dmitry Suhol
*Assistant Examiner* — Alex F. R. P. Rada, II
(74) *Attorney, Agent, or Firm* — Kolisch Hartwell, PC

(57) ABSTRACT

An electronic banking toy is provided. The toy may include a housing defining a storage compartment with an adjoining slot for depositing coins. A controller may display graphical and auditory representations of activities on a display screen based on the sensed location of an icon moveably mounted in a track.

29 Claims, 13 Drawing Sheets

U.S. PATENT DOCUMENTS

| | | |
|---|---|---|
| 2006/0160588 A1 | 7/2006 | Yamada et al. |
| 2006/0292956 A1 | 12/2006 | Sayles |
| 2007/0178980 A1* | 8/2007 | Hardin et al. .................. 472/75 |
| 2008/0108272 A1* | 5/2008 | Lin .................................. 446/8 |

FOREIGN PATENT DOCUMENTS

| | | |
|---|---|---|
| GB | 2248605 | 4/1992 |
| JP | 11318532 | 11/1999 |
| JP | 2005296560 | 10/2005 |

* cited by examiner

ELECTRONIC BANKING TOY

CROSS REFERENCE TO RELATED APPLICATIONS

This application claims priority under 35 U.S.C. §119(e) to U.S. Provisional Patent Application No. 60/977,318 entitled "Banking Toy," filed Oct. 3, 2007, the disclosure of which is incorporated herein by reference.

BACKGROUND

Some electronic banking toys allow a user to set a target savings amount and a deadline for reaching the target. In such banking toys, as the user approaches the target savings amount, the life of a virtual character shown on an LCD screen progresses. For example, as more coins are placed in the bank, the character moves from a meager house to a nice house, gets married, and finds a better job. Other banking toys reward a user with stickers as the user saves more money in the bank.

Examples of banking toys are found in the following patents and published patent applications: U.S. Pat. No. 3,940,141, U.S. Pat. No. 3,992,805, U.S. Pat. No. 3,997,045, U.S. Pat. No. 4,226,044, U.S. Pat. No. 4,282,674, U.S. Pat. No. 4,295,036, U.S. Pat. No. 4,799,678, U.S. Pat. No. 5,465,909, U.S. Pat. No. 5,716,211, U.S. Pat. No. 5,944,254, U.S. Pat. No. 5,976,018, U.S. Pat. No. 6,364,771, U.S. Pat. No. 6,454,570, U.S. Pat. No. 6,461,238, U.S. Pat. No. 6,685,565, U.S. Pat. No. 6,896,573, U.S. Pat. No. 6,902,459, U.S. Pat. No. 6,976,619, U.S. Pat. No. 7,128,644, US20020119744, US20060160588, US20060292956, JP1318532, and JP2005296560.

The disclosures of all the patent publications, patents, and other publications recited in this application are incorporated herein by reference in their entirety for all purposes.

SUMMARY OF THE DISCLOSURE

The present disclosure provides for an electronic banking toy and components thereof. The electronic banking toy includes a housing defining a storage compartment and adjoining slot for depositing and saving coins. An icon resembling a character may be movably mounted in a track formed in the housing. The track may be located in front of physical icons, such as buildings, to provide the appearance the icon is walking in front of the physical icons.

A controller including electronics such as a processor, memory, and sound card may display graphical and auditory representations of activities on a display screen based upon the sensed location of the icon relative to the physical icon. A user may interact with the activities using a remote control with input buttons to control functions of the activity. The controller may monitor a virtual bank account that adds value when a coin is deposited and deducts from the account when an activity is depicted on the display screen.

The advantages of the present invention will be understood more readily after a consideration of the drawings and the Detailed Description below.

DETAILED DESCRIPTION

Figure 1:
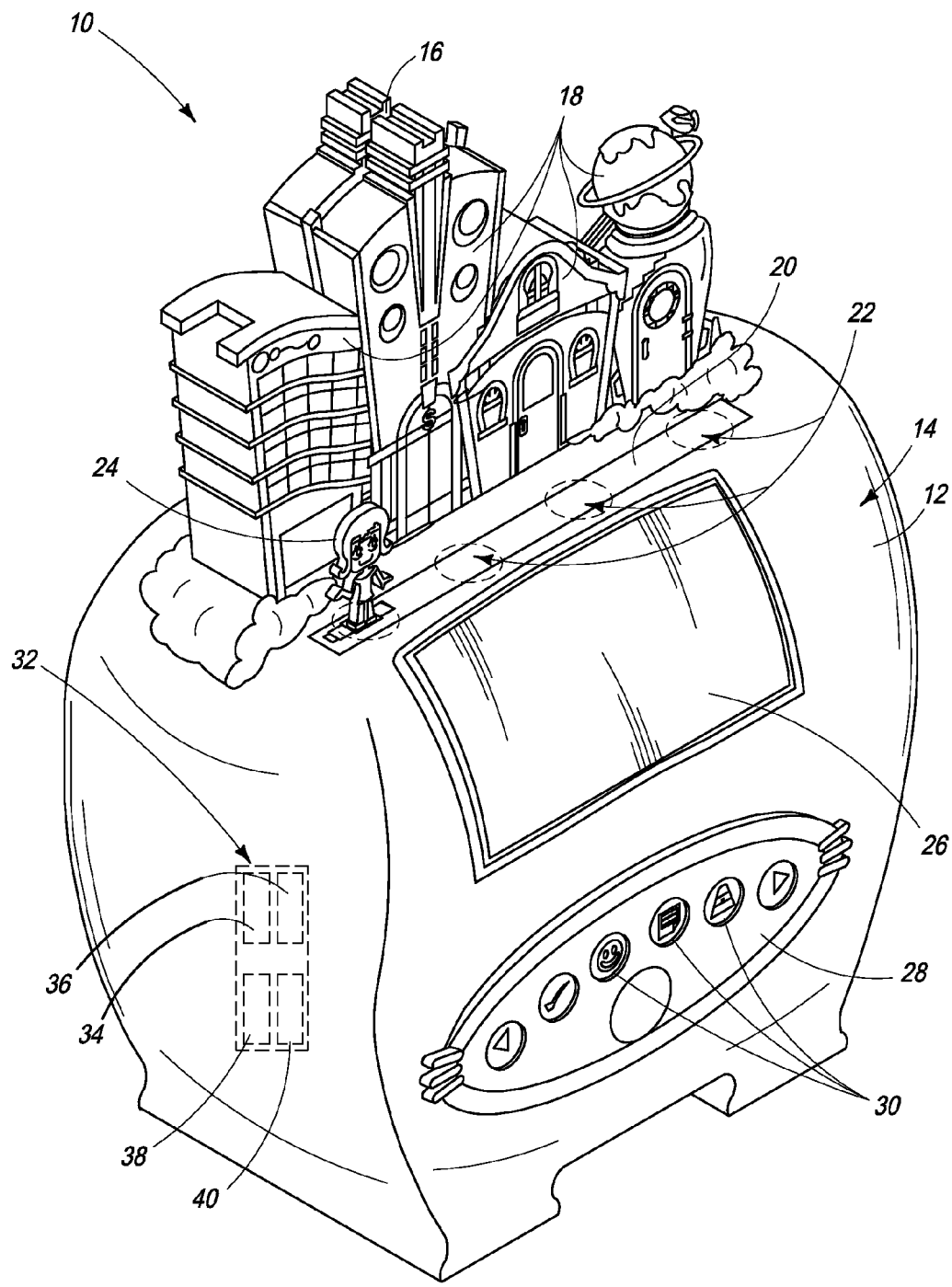
FIG. 1 is a perspective view of an example of an electronic banking toy having a housing having one or more integrally formed physical icons, a moveable icon mounted in a track, a display screen, a remote control having input buttons, and a controller.

FIG. 1 shows a perspective view of an example of an electronic banking toy 10 having a housing 12 defining a storage compartment 14 for coins with an adjoining slot 16 and one or more integrally formed physical icons 18. A track 20 having one or more switches 22 may be formed in housing 12 adjacent physical icons 18 and an movable icon 24 may be slidably mounted in track 20. Banking toy 10 also may include a display screen 26 mounted on housing 12 and a remote control 28 including one or more input buttons 30.

Banking toy 10 also may include a controller 32 comprising electronics including one or more of a processor 34, a memory chip 36, and a sound card 38 stored inside housing 12. Controller 32 may be configured to receive switch or sensor outputs from one or more components of banking toy 10 and provide an appropriate response. Controller 32 also may include software or programming configured to provide graphical and auditory representations of activities on display screen 26 and monitor a virtual bank account.

Interior storage compartment 14 may be suitable for storing coins. Slot 16 is formed in housing 12 and may be suitable for receiving coins for storage in interior storage compartment 14. In some examples of banking toy 10, slot 16 may be sized to receiving paper currency in addition to coins.

Physical icons 18 may resemble buildings or other physical structures. Physical icons 18 of FIG. 1 are constructed to resemble a mall, bank, house, and amusement park. In the embodiment of banking toy 10 shown in FIG. 1, slot 16 is formed in a physical icon 18.

Track 20 may be formed in housing 12 adjacent physical icons 18. Movable icon 24 may be moveably mounted in track 20 such that movable icon 24 may slide from one end of track 20 to the other. In the embodiment shown in FIG. 1, movable icon 24 is moveably mounted in track 20 so as to provide the appearance that movable icon 24 is walking along a boardwalk in front of several buildings.

One or more sensors or switches 22 may be disposed in track 20. In some embodiments, switches 22 may be tact switches. Switches 22 may be triggered as movable icon 24 slides along track 20. Switches 22 may provide a switch output when triggered. As shown in FIG. 1, switches 22 may be positioned in track 20 adjacent or proximate to physical icons 18 formed in housing 12. In some embodiments, switch 22 may be associated with or correlate to the physical icon 18 to which switch 22 is proximate.

For example, in the example of banking toy 10 shown in FIG. 1, a switch 22 is located in front of each of the physical icon 18 formed in housing 12. The switch 22 that is positioned in track 20 directly in front of each physical icon 18 is associated with the most proximal physical icon 18. As movable icon 24 slides along track 20, the switch 22 located in front of the building is triggered and provides corresponding switch output.

Display screen 26 may be mounted to housing 12. Display screen 26 may be an LCD screen. Display screen 26 may be configured to show animations or representations of activities stored in controller 32.

Controller 32 may be stored inside housing 12 and may include associated electronics. Electronics may include one or more of a processor 34, a memory chip 36, and a sound card 38. Controller 32 also may include software or programming configured to provide graphical and auditory representations of activities on display screen 26 and monitor a virtual bank account.

The graphical representation of an activity selected from the library stored in controller 32, may be based on the location of the movable icon 24 sensed by switches 22. In some embodiments, the activity selected by controller 32 may relate to the subject matter the physical icon 18 proximate to icon 24. For example, if icon 24 is proximate to a physical icon 18 resembling an amusement park or arcade, the activity selected by controller 32 may be an interactive game. Other examples or correlations are detailed below.

Controller 32 may be configured to receive outputs from one or more sensors or switches 22 and provide an appropriate response. For example, controller 32 may be configured to receive outputs from one or more switches 22 disposed in track 20 and one or more input buttons 30 on remote control 28. Upon receiving inputs from sensors or switches 22, controller 32 may provide an appropriate response.

Controller 32 may store a library of graphical representations of activities or animations. Graphical representations of activities may be configured to be displayed on display screen 26. Graphical representations may include interactive games or activities, purchasing virtual items, or providing "secret codes" for use on a website maintained in conjunction with banking toy 10.

Controller 32 also may include a library of audio clips that may be played on one or more speakers 40 disposed within housing 12. Audio clips may be played on speakers 40 individually or in conjunction with graphical representations.

Remote control 28 may also be connected to controller 32. One or more input buttons 30 configured to control functions of banking toy 10 may be disposed on remote control 28. Input buttons 30 may permit a user to control functions of a graphical representation of an activity, such as an interactive game, activity, or animation. Examples of input buttons 30 may include a volume button, one or more directional buttons, and a select button.

Figure 2:
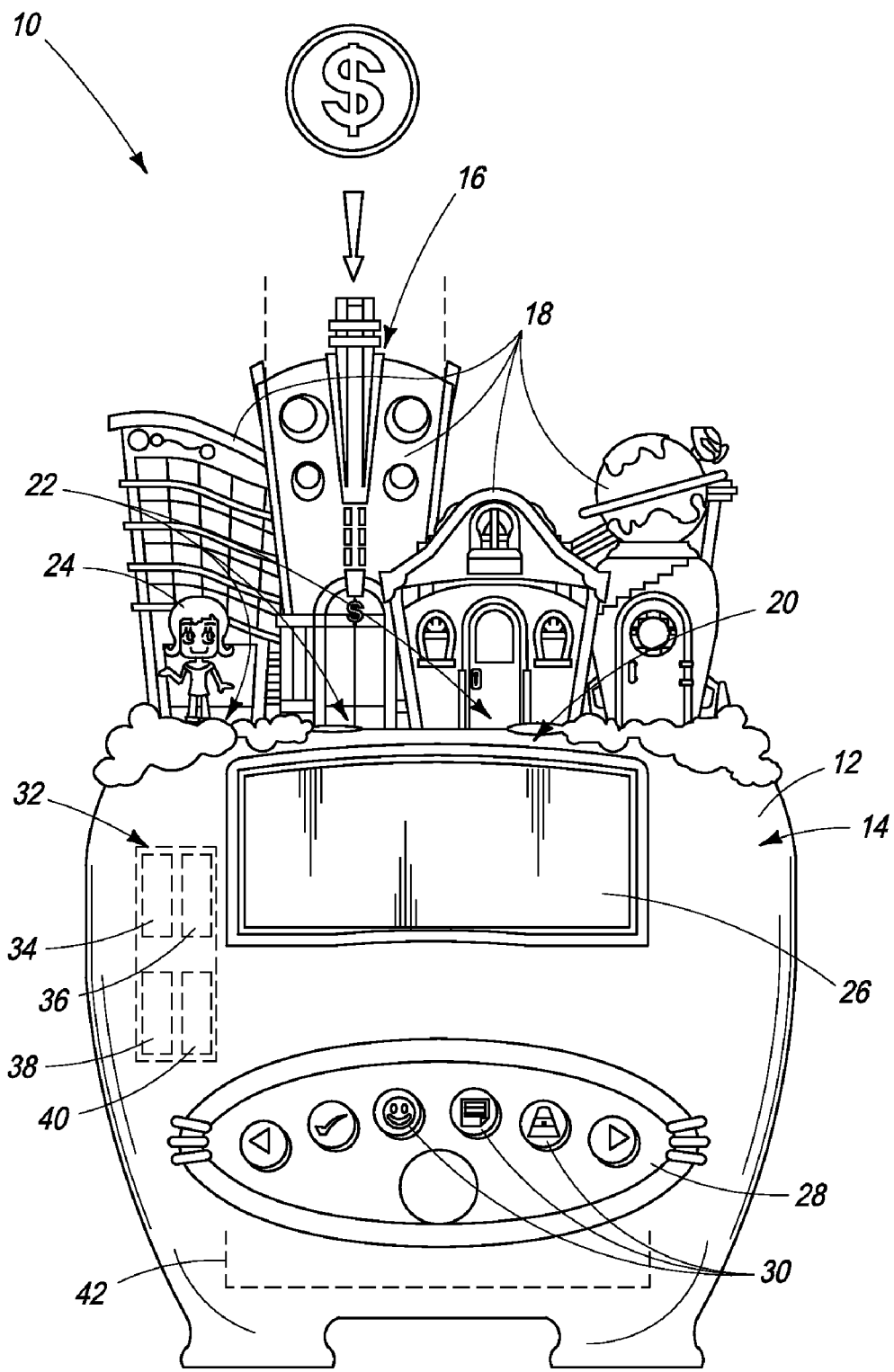
FIG. 2 is a front view of the example of the electronic banking toy depicted in FIG. 1.

As shown in FIG. 2, banking toy 10 also may include a drawer 42 disposed in housing 12. Drawer 42 may be located at the bottom of housing 12 in order to collect any deposited coins. A drawer switch may be disposed within housing 12 adjacent drawer 42 and connected to controller 32. Controller 32 may reset bank account balance when drawer switch is triggered.

Figure 3:
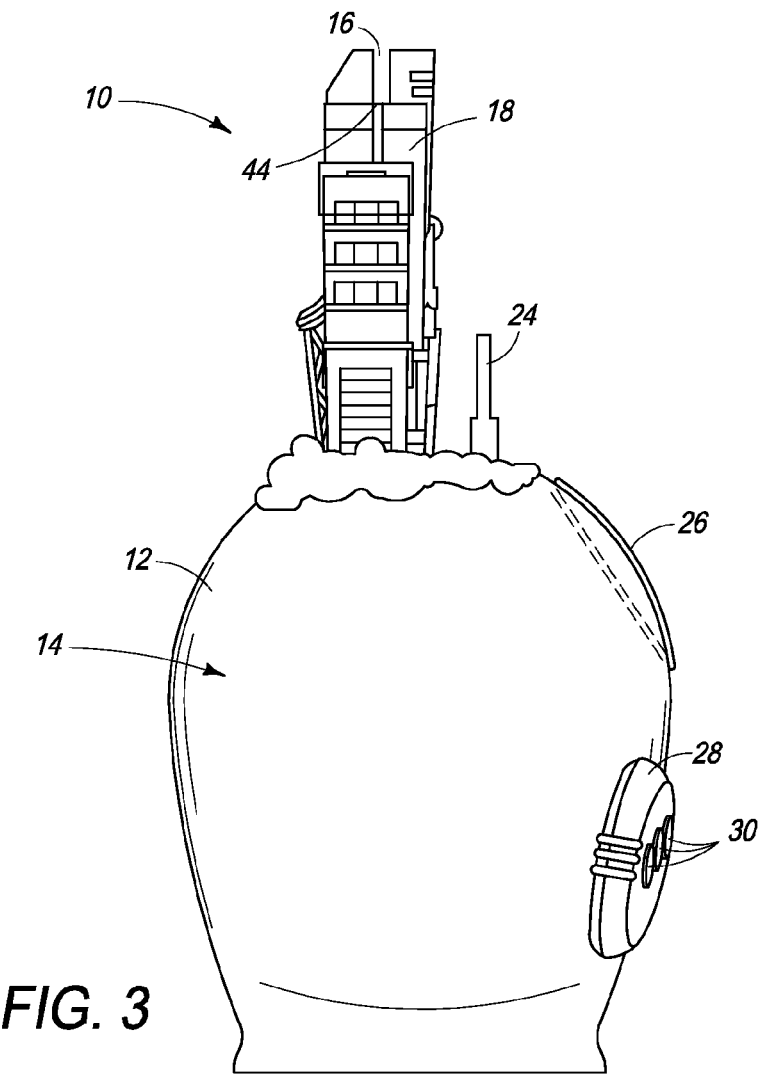
FIG. 3 is a side view of the example of the electronic banking toy depicted in FIGS. 1-2.
Figure 4:
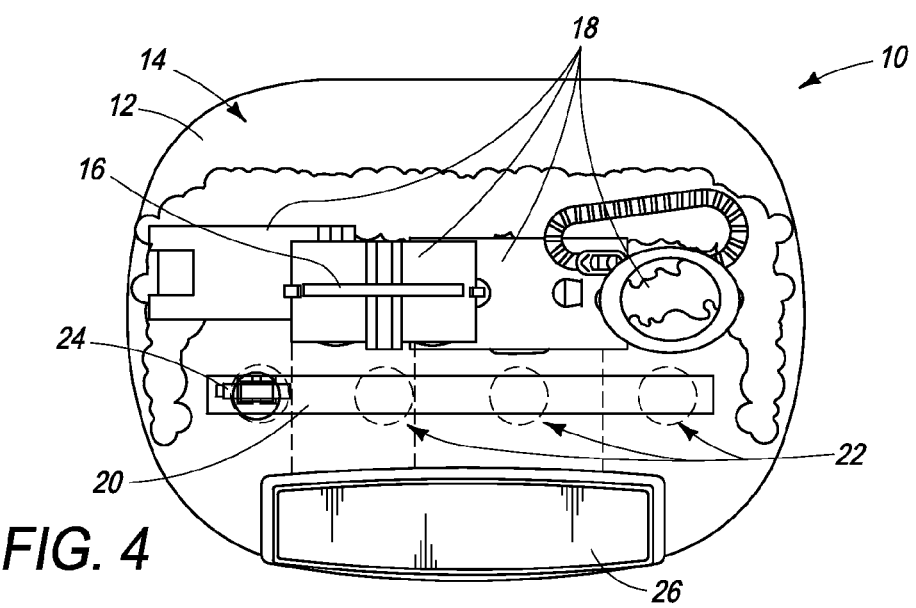
FIG. 4 is a top view of the example of the banking toy depicted in FIGS. 1-3.

FIGS. 3 and 4 show side and top views, respectively, of banking toy 10. As shown in FIGS. 3 and 4 slot 16 may be formed in a physical icon 18 to provide an opening to deposit coins in storage compartment 14 defined by housing 12.

As shown in FIG. 3, a coin sensor 44 may be disposed adjacent slot 16 so that it is triggered when a coin is deposited into housing 12. Coin sensor 44 may be connected to controller 32 and may provide a sensor output to controller 32 when a coin is deposited into housing 12. In some embodiments, coin sensor 44 may be a leaf switch.

When a coin is deposited into slot 16 and triggers coin sensor 44, controller 32 may assign the deposited coin a value. The amount assigned by controller 32 may be random. The value may be added to a virtual bank account maintained and monitored by controller 32.

When a graphical representation of an activity is displayed on display screen 26 and interacted within by a user, controller 32 may deduct a predetermined amount from the bank account. If the user does not have a sufficient balance to participate in a desired graphical representation of an activity, controller 32 may not permit the activity to be displayed. Each graphical representation may have an assigned value that may be deducted from the bank account monitored by controller 32. For example, an amount may be deducted for each virtual item purchased or it may cost a certain amount to play a video game.

Figure 5:
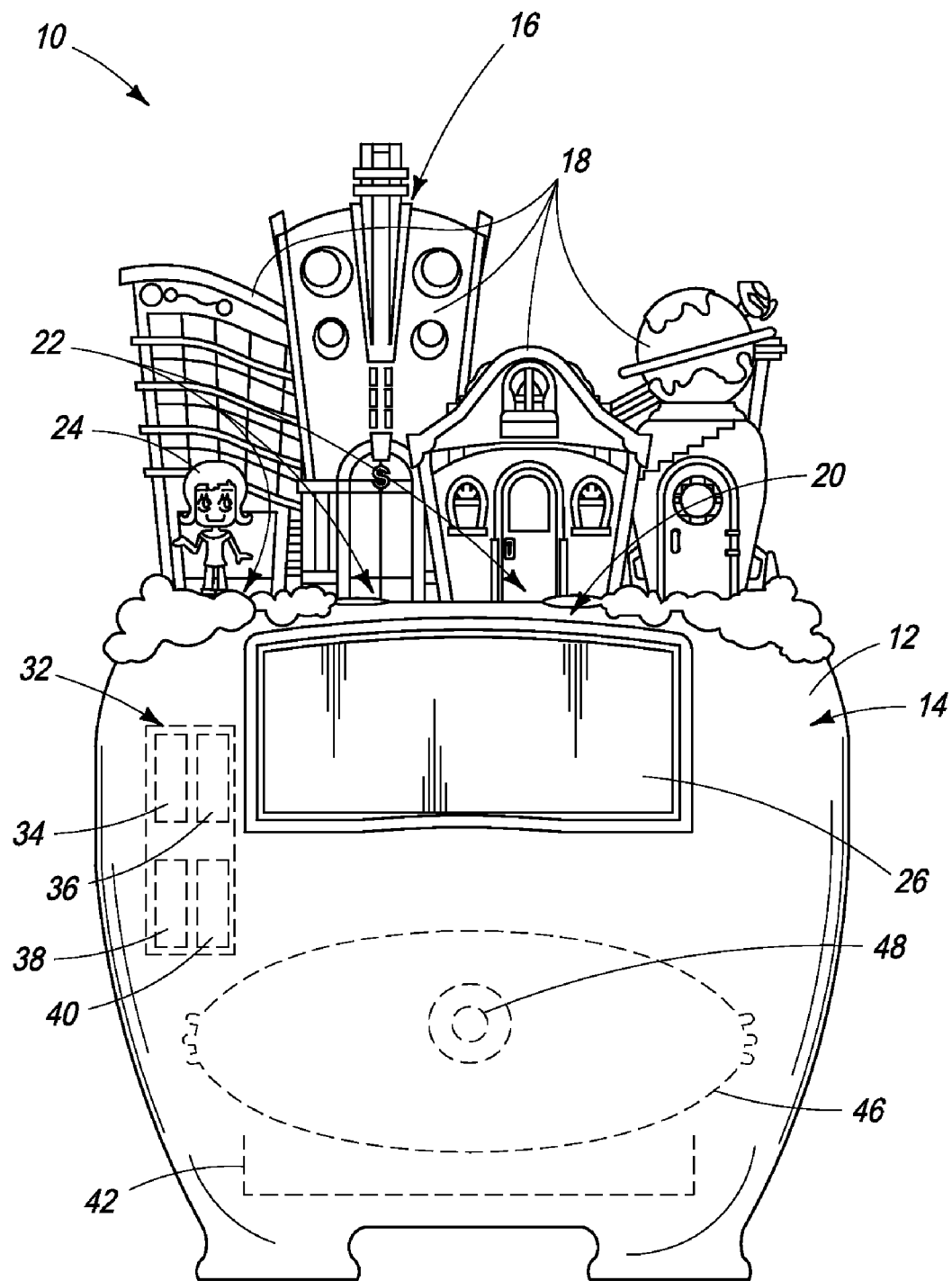
FIG. 5 is a front view of the example of a banking toy depicted in FIG. 1 where the remote control is removed from the housing.

FIG. 5 shows a front view of banking toy 10 with remote control 28 removed from housing 12. Housing 12 may form a recess 46—as indicated by hashed lines—where remote control 28 may snap into place for storage. An aperture 48 may be formed in recess 46 to permit a cord 50—shown in FIG. 6—to connect remote control 28 to controller 32.

Figure 6:
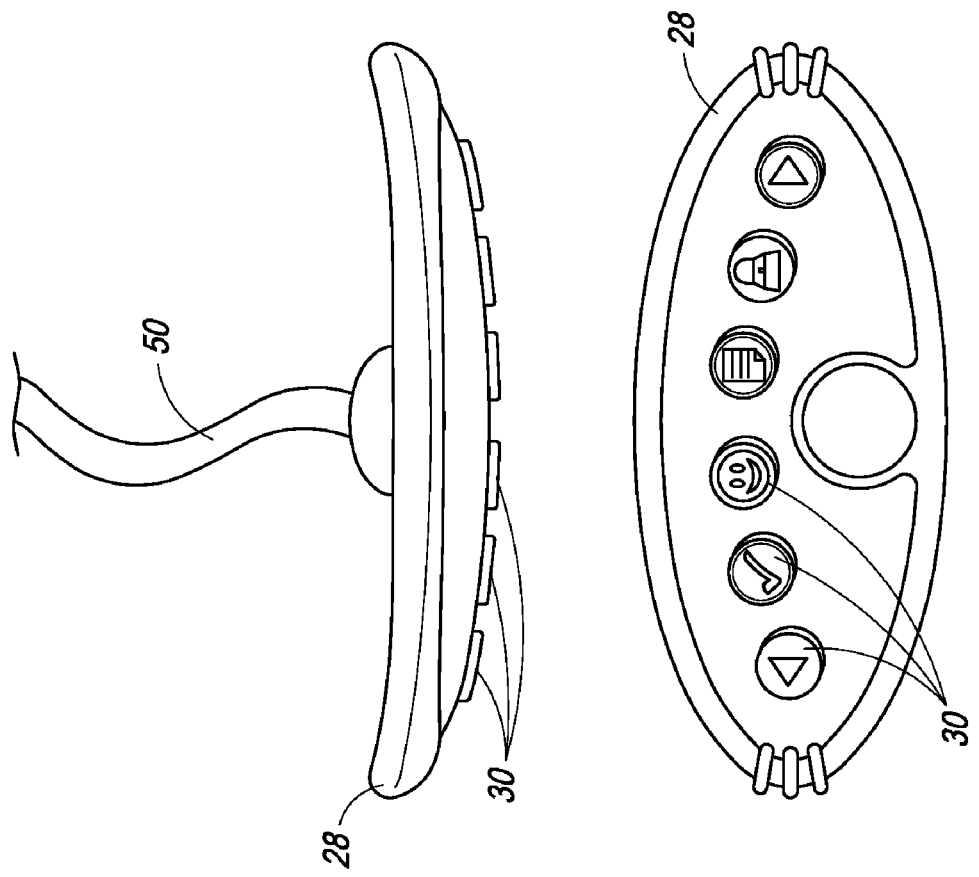
FIG. 6 is shows top, side, and front views of a remote control having input buttons for use with a banking toy of the present disclosure.
Figure 6:
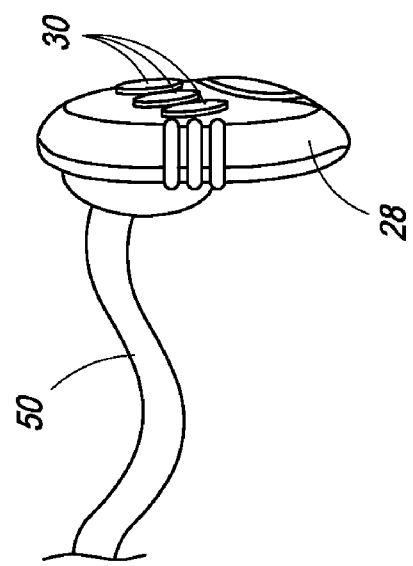

FIG. 6 shows a front, side, and top view of a remote control 28 including input buttons 30 for use in banking toy 10. Cord 50 may connect remote control 28 and input buttons 30 to controller 32. Controller 32 may receive output signals from remote control 28 and respond appropriately.

FIGS. 7-10 depict exemplary still images from graphical representations of activities that may be depicted on display screen 26. The still images of graphical representations of activities shown in FIGS. 7-10 may be depicted on display screen 26 individually or as part of an animation. Each of the images or animations may be stored on controller 32.

Figure 7A:
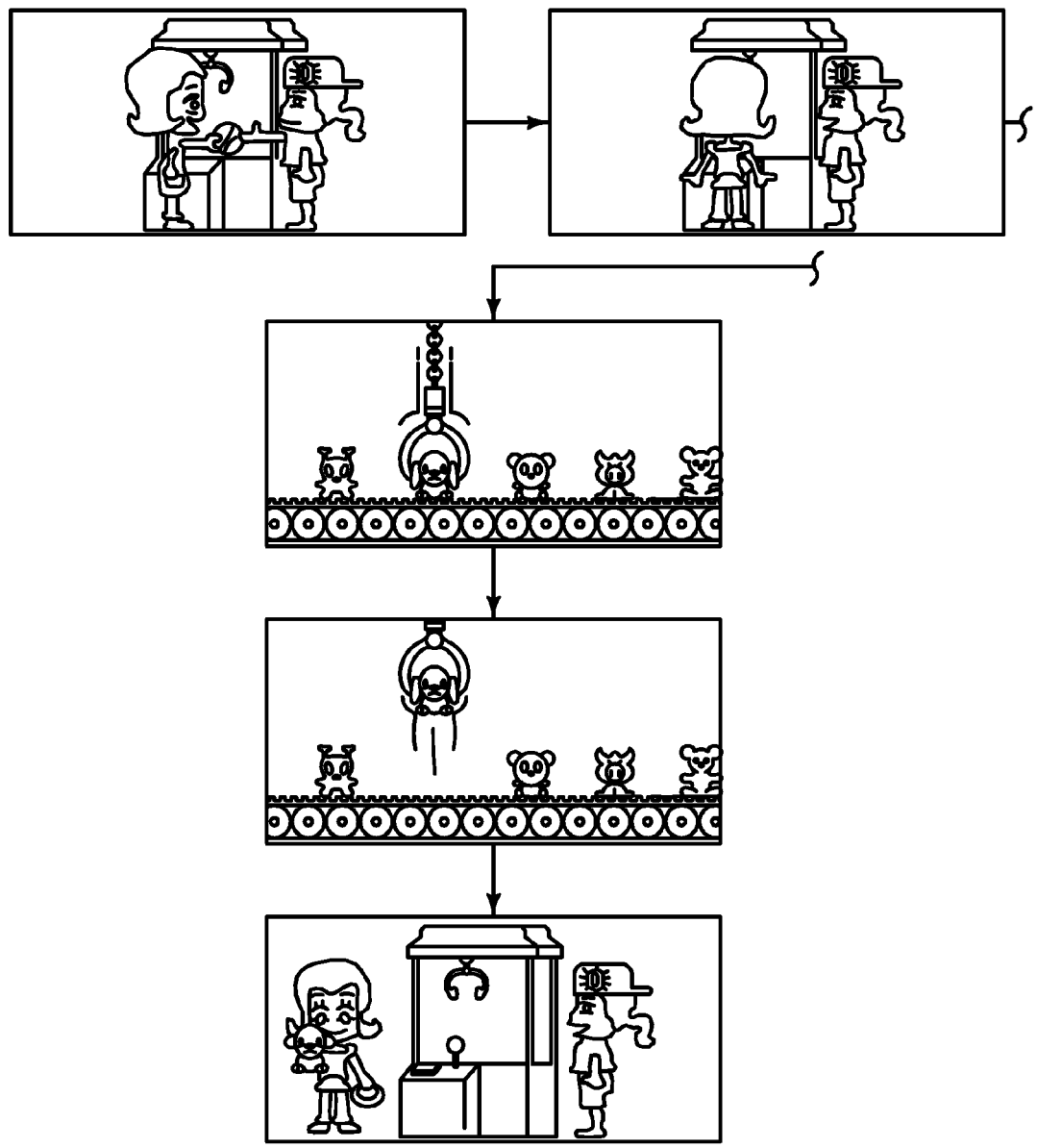
FIG. 7 is a series of still images that may be depicted on a display screen of an electronic banking toy of the present disclosure as part of a representation of an activity depicting a virtual character playing a game.
Figure 7B:
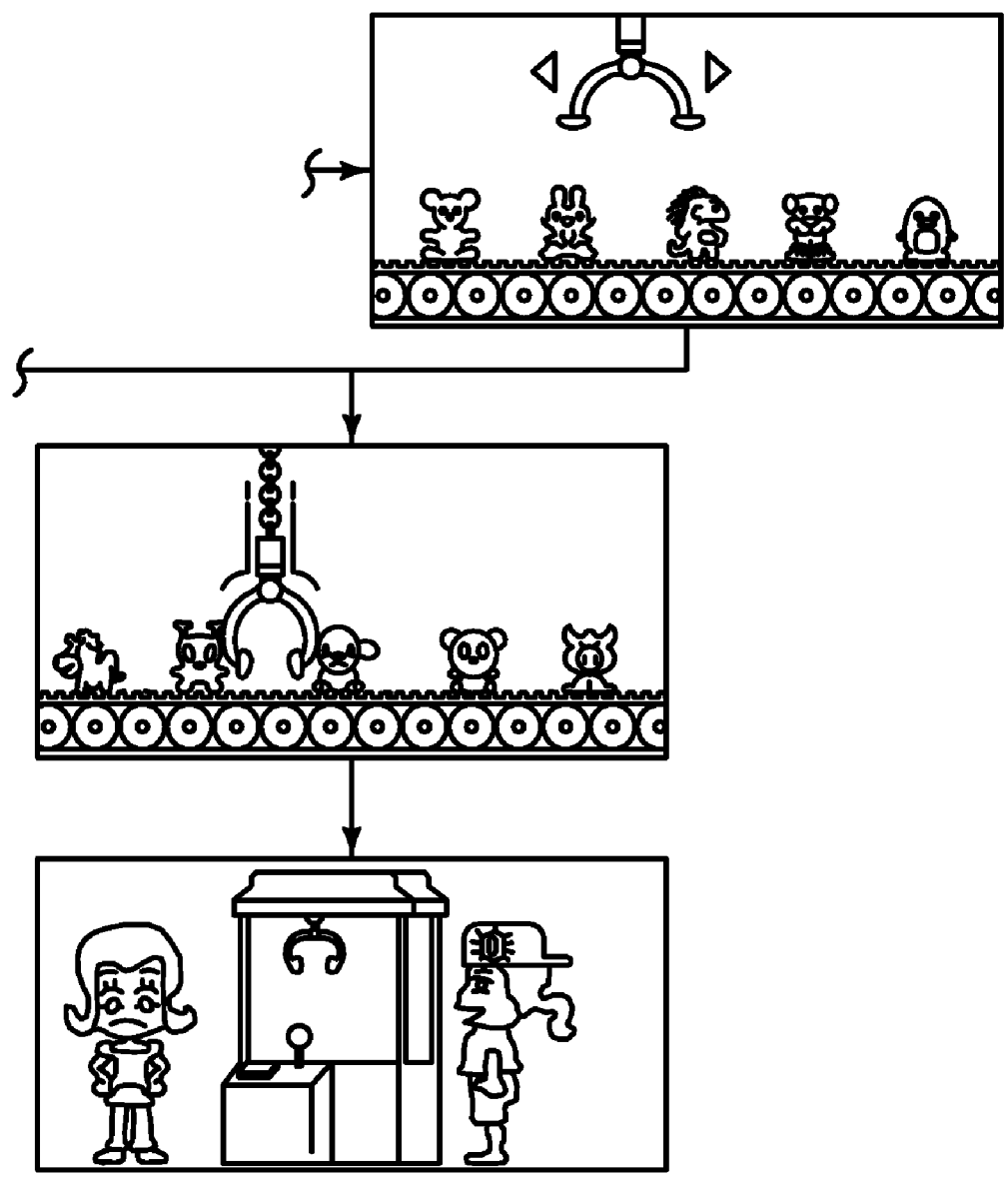
Figure 8A:
FIG. 8 is a series of still images that may be depicted on a display screen of an electronic banking toy of the present disclosure as part of a representation of an activity depicting a virtual character shopping and purchasing various items at a store.
Figure 8A:
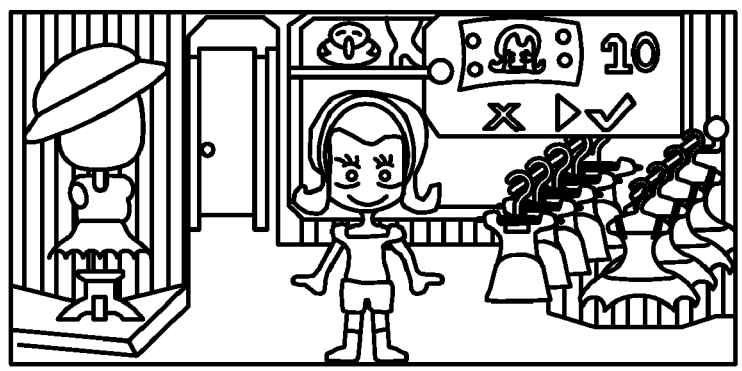
Figure 8A:
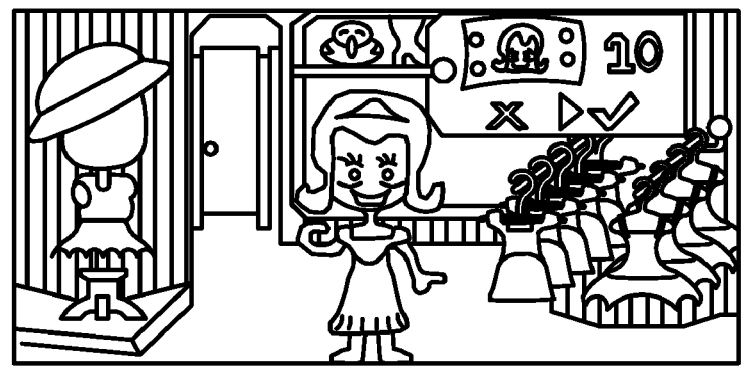
Figure 8A:
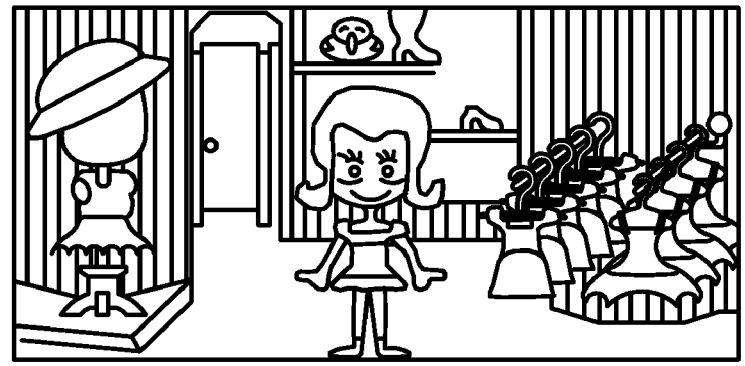
Figure 8B:
Figure 8B:
Figure 8B:
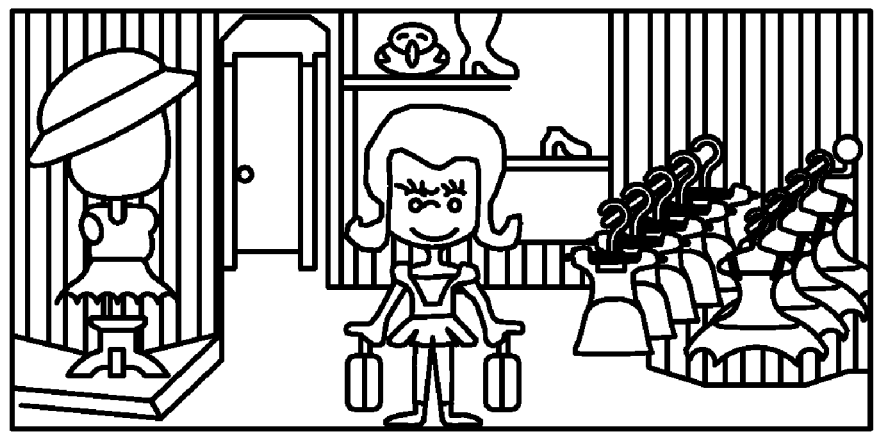
Figure 9A:
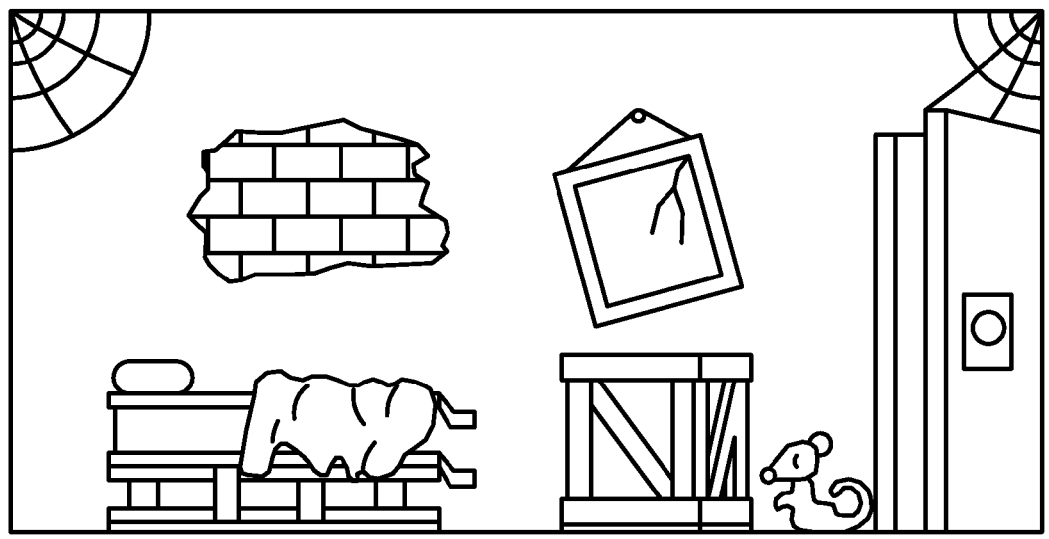
FIG. 9 is a series of still images that may be depicted on a display screen of an electronic banking toy of the present disclosure as part of a representation of an activity depicting a bedroom having various virtual items.
Figure 9A:
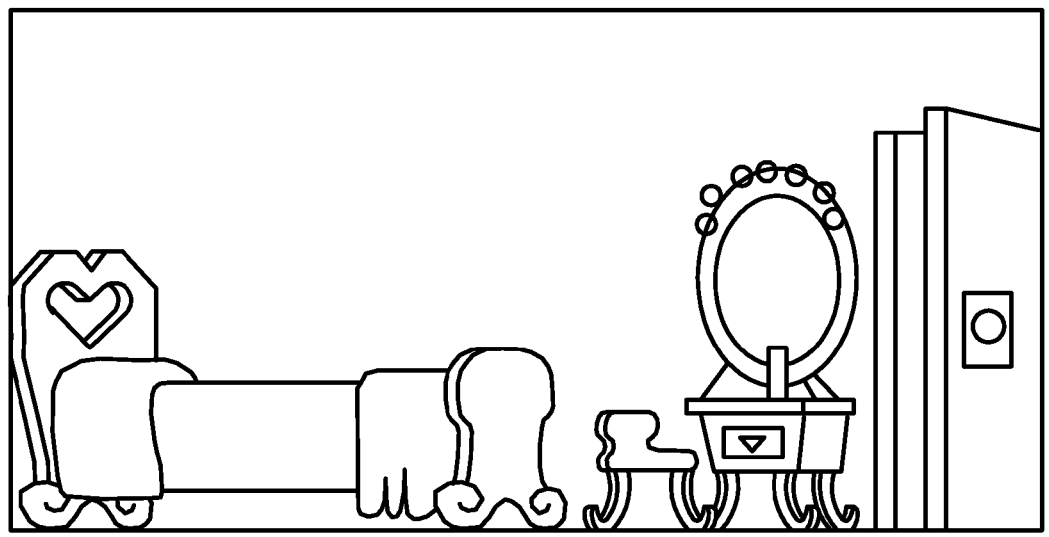
Figure 9B:
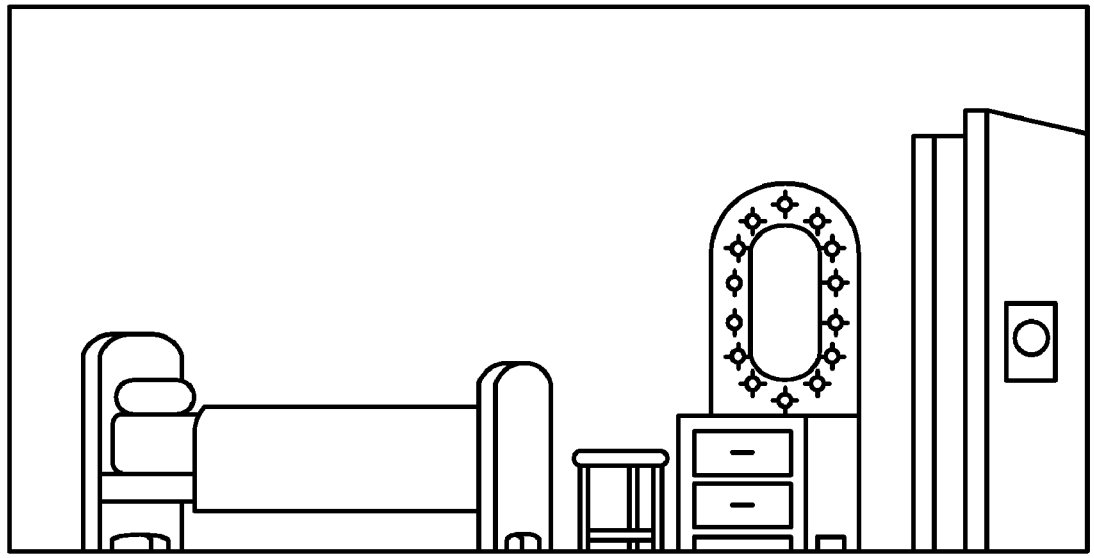
Figure 9B:
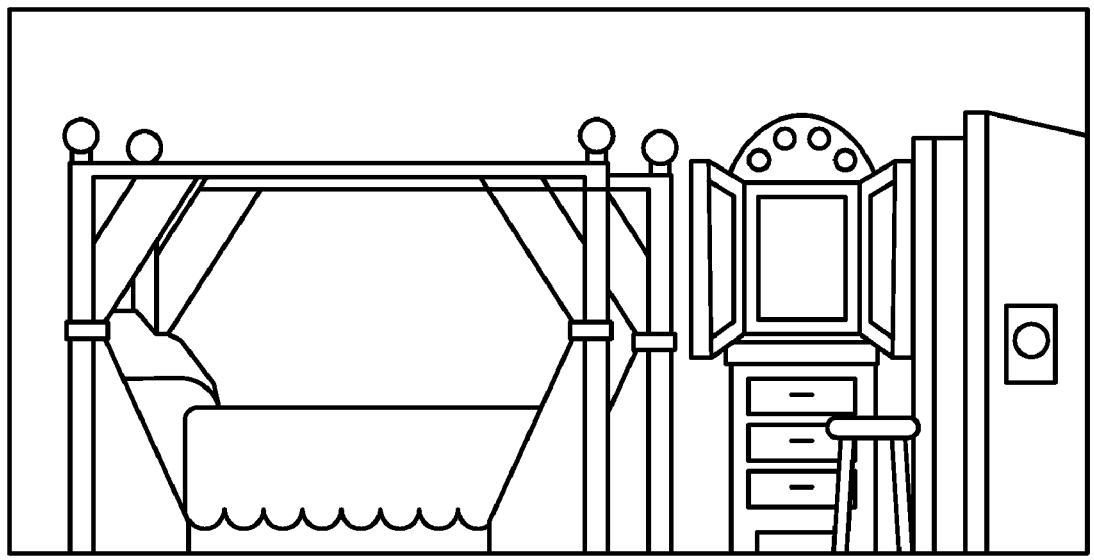
Figure 10A:
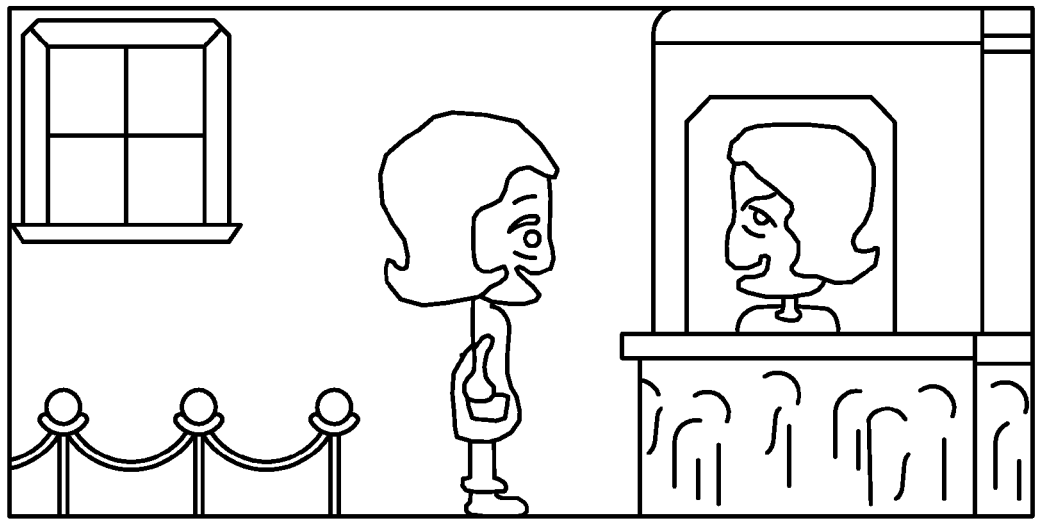
FIG. 10 is a series of still images that may be depicted on a display screen of an electronic banking toy of the present disclosure as part of a representation of an activity depicting a virtual character at a bank checking an account balance.
Figure 10A:
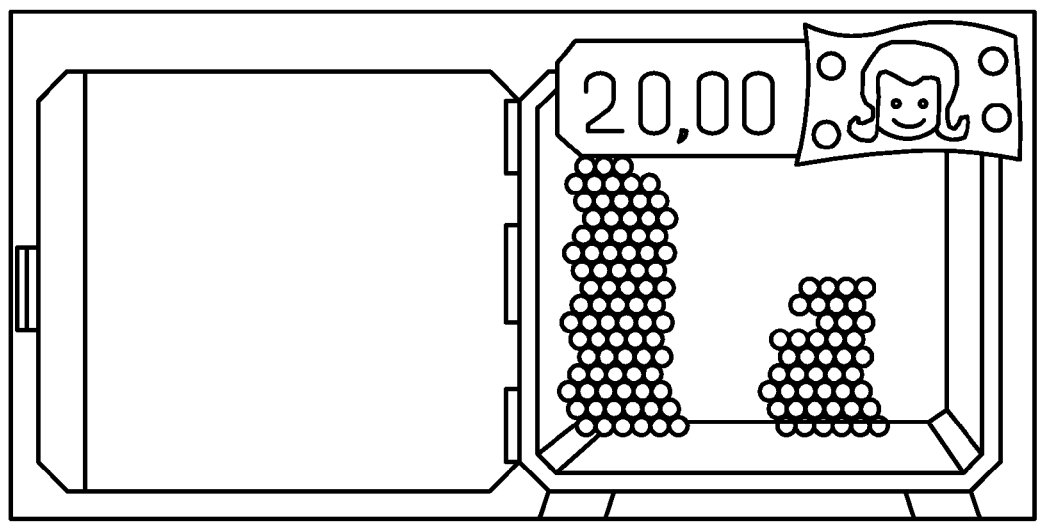
Figure 10B:
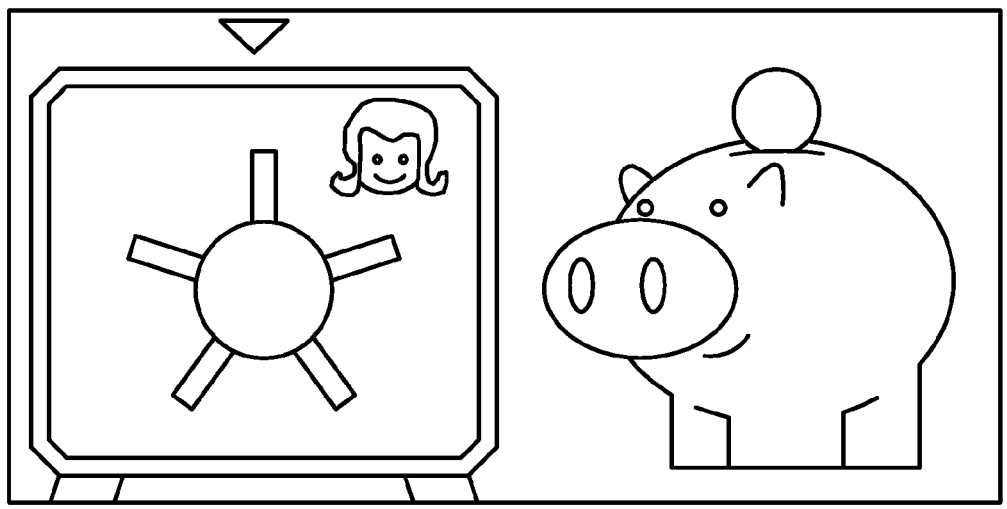
Figure 10B:
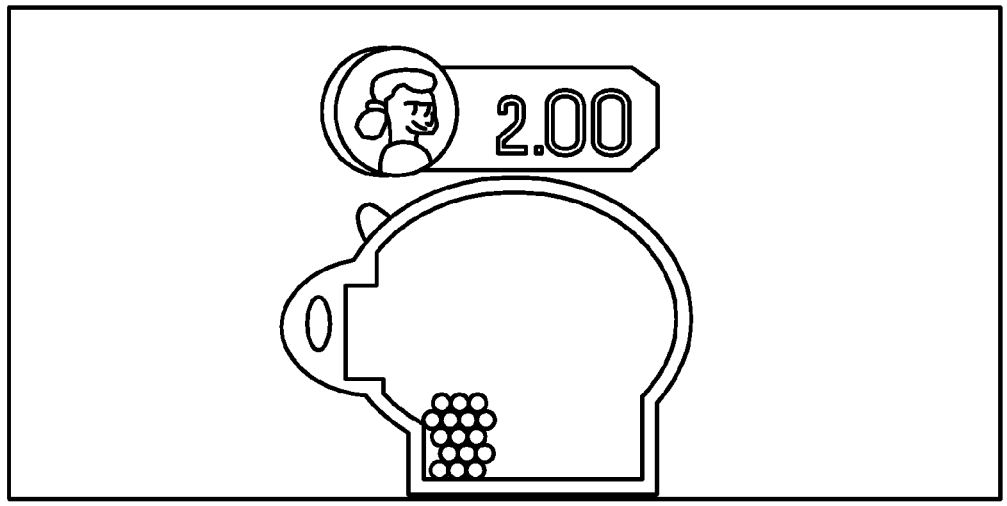

FIG. 7 shows a series of still images that may be part of a representation of an activity related to playing a game and shown on display screen 26. The still images of FIG. 7 show an interactive video game that may be depicted on display screen 26. The game may displayed by controller 32 when icon is sensed in front of a physical icon resembling an amusement park or other similar structure.

The exemplary video game shown in FIG. 7 may permit a user to attempt to capture an object with a claw-like structure while the objects are moving on a conveyor belt. Input buttons 30 on remote control 28 may be used to control the functions of the video game. For example, when triggered an input button 30 may cause the claw-like structure to attempt to capture the object. Input buttons 30 may allow users to control similar functions in other examples of activities. The images of FIG. 7 may be displayed when movable icon 24 is sensed proximate to a physical icon 18 resembling an amusement park.

FIG. 8 shows a series of still images that may be part of a representation of an activity permitting a user to shop for and/or purchase virtual items. In the images of FIG. 8, a virtual character depicted shopping for clothes. Input buttons 30 may permit user to make selections while purchasing virtual items. The still images of FIG. 8 may be depicted when movable icon 24 is sensed by a switch 32 in front of a physical icon 18 resembling a mall or store front.

FIG. 9 shows a series of still images that may be part of a representation of an activity or animation showing a location where purchased virtual items may be stored and interacted with. A user may purchase virtual items to improve locations such as a home. The purchased virtual items may be stored by controller 32 for future interaction by a user. The images of FIG. 9 may be depicted when icon is sensed by a switch associated with a physical icon 18 resembling a house.

FIG. 10 shows a series of still images that may be part of a representation of an activity or animation depicted a virtual character checking a bank account balance. Controller 32 may monitor the bank account balance by adding an amount when a coin is deposited and deducting an amount when a representation of an activity is activated. An animation, such as the one shown in FIG. 10, may be displayed when icon 24 is moved in front of a physical icon 18 resembling a bank.

Although the above is one method of using the disclosed electronic banking toy, alternative descriptions of the disclosed banking toy are provided below.

The present application discloses a banking toy having a housing, a figurine, a display screen, and one or more control inputs. Housing contains a memory chip, sound chip, processor, and one or more speakers. Software for monitoring a "bank account" may be saved on memory chip. One or more animations and/or games also may be stored on memory chip. Sound chip may store one or more pre-recorded songs and/or sounds that may be played on speakers. Songs and sounds may be played individually or in conjunction with an animation or game.

Housing also has one or more integrally formed buildings. Buildings of are shaped to resemble a mall, bank, house, and amusement park. Buildings may, however, be formed to resemble any structure. One or more buildings may form a slot into which users may deposit coins. When coins are inserted into slot, they may be stored in housing. Slot also may be configured to receive paper money.

Housing may contain a drawer for storing deposited coins. Drawer may be opened to recover coins from housing. A switch may be disposed adjacent drawer. Switch may be triggered when drawer is opened. Software may monitor switch so an appropriate response or action may be generated.

Housing may form a track located in front of buildings. Figurine may be slidably mounted in track so as to appear to be standing in front of buildings. Sliding figurine from side to side of track may give the appearance that figurine is walking along a boardwalk in front of buildings.

Display screen may be mounted to housing. Housing may form a recess that display screen may be placed into, providing a seamless appearance. Display screen may show animations or games stored in memory.

The animations and games stored in memory may involve a virtual character resembling figurine. The data and/or animation displayed may correlate to a particular activity being performed with figurine. For example, if figurine is standing in front of a particular store or building, an animation related to that particular store or building may be displayed.

Control inputs may dictate the operation of toy. Control inputs may be one or more buttons disposed on housing. Software may monitor control inputs so an appropriate response or action may be generated. Examples of control inputs include controls to alter the volume, permit selection of options provided on display screen, or change display screen images or animation.

In some embodiments, control inputs may be placed on a remote control. Remote control may be tethered to housing by an electrical cord. Electrical cord may be retractable.

Housing may form track and figurine may be slidably mounted into track. Switches may be disposed in track at locations in front of each individual building. Switches are triggered when figurine slides along track in front of buildings. Software may monitor each switch so an appropriate response or action may be generated when switch is triggered.

Control inputs may be disposed on a remote control. Remote control may be removed from housing. Housing may form a recess where remote control may be stored. Housing also may have an aperture located within recess so electrical cord may connect to memory and/or processor. Recess may be formed so as to allow remote control to securely snap into place for storage.

Remote control may include one or more control inputs and electrical cord. Electrical cord may tether remote control to toy. Software may monitor input controls on remote control via electric cord so an appropriate response or action may be generated when control inputs are engaged.

The disclosed toy may have a series of control inputs. Control inputs may be a series of buttons. The series of button may include a menu button, a "fun" button, a "purse" button, left and right directional buttons, and a select button.

The menu button may allow the user to choose an item for the virtual character to interact with in the current building. When the menu button is pressed, an arrow may appear on the display screen above one of the selectable items found in the building in which figurine is located. The user can press the left and right directional buttons to move the arrow to a different selectable item and the select button to choose an item. Items chosen from the menu button may be tied to specific set of linear animations as opposed to actual games.

The "fun" button may cause a submenu to appear on the display screen that permits the user to choose a game icon. Each game icon may represent a different game a user can play if it has been "unlocked." Game icons that are still "locked" may be shown but grayed out. "Unlocked" game icons may be shown in full gray scale. The user can press the left and right directional buttons to move the selection arrow and the select button to choose a game to play on the display screen.

The "purse" button may cause the amount currently available in the bank account to be shown on the display screen.

The left and right directional buttons and select button may used for a variety of purposes. The left and right directional buttons may be used to scroll through options provided on the display screen or move the virtual character during a game. The select button may be used to make a choice, to move a virtual character around on the display screen, or make the virtual character perform certain actions such as throwing or ducking during a game.

The toy may permit a user to purchase items at a store to upgrade and/or change any items already owned. A user may purchase furniture, electronics, toys, fashions, and items to improve a backyard. When an item is purchased at a store, it may automatically replace a corresponding item the user already owns Each purchasable item has certain animations linked to it that may be "unlocked" when the user already owns that item. Though items may increase in quality and price, a user may buy items in any order. For example, a user may choose to save up and buy the huge flat screen television or a television that is slightly larger than the television currently owned.

Purchasing certain items may "unlock" games when they are purchased. Once such an item has been purchased, its respective game may remain unlocked whether or not the user replaces the item with a different item.

The user may change the location of the virtual character in the software to different locations by sliding the figurine back and forth on a track until she rests in front of one of buildings. As soon as the figurine is moved from a spot in front of one of the buildings, the display screen may show an animation displaying the virtual character strolling until the figurine is located in front of another building.

The user also may have the ability to control the virtual character representation of the figurine on the screen. The left and right directional buttons may be used to direct the virtual character on the display screen.

"Money" may be added to the bank account by entering coins into the toy, choosing to save "money" to earn interest, finding "money" in certain areas of the game play, and winning certain games. In each of these instances, money may be accessible to purchase new items and/or "unlock" new games.

When a coin—fictitious or real—is entered into the unit, the hardware may sense the coin and assign the coin a value. This value may have no relation to the actual monetary value of the coin entered. The value of the coin may change slightly as more coins are put into the unit.

When a coin is entered, the user may choose to either save the amount or spend the amount by choosing a bank icon or purse icon shown on the display screen. If the user selects the bank icon, the amount may be added to savings, where it may earn periodic interest. If, on the other hand, the user selects the purse icon, the amount may be spent to purchase a new item.

Occasionally, the user may find "money" in certain areas of the game play. When this happens, the "money" may be placed into the bank account or spent on a new item.

When the user successfully completes a game the user may be awarded "money." When this happens, the "money" may be placed into the bank account or spent on a new item.

The user may choose to have the virtual character spend an amount on food, rides, purchases, or other activities. Each activity or purchase may have a specific price that may be communicated on the display screen. After each purchase, a screen showing the current account balance may show on the display screen. If the user does not have a sufficient amount in the account to buy a specific item, the user may not buy that item unless more is earned.

A drawer in the housing that opens up and allows the user to remove the coins that they have put inside the product may be provided. A switch under this drawer may notify the software when the drawer is opened.

The user may be awarded a new web code that may be entered onto a website that runs in conjunction with the toy. The code may allow the user to "unlock" games and activities online.

While embodiments of a toy and methods of toy play have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. An electronic banking toy comprising:
a housing defining an interior storage compartment for coins and a slot configured to receive coins;
a display screen mounted on the housing and including electronics configured to display animations of a character on the display screen;
one or more physical icons integrally formed on the housing;
a track located on the housing adjacent the physical icons;
a movable icon coupled to the housing and moveable along the track;
a switch associated with at least one of the physical icons and configured to sense when the icon is proximate to the at least one of the physical icons, the switch connected to the electronics;
a coin sensor adjacent the slot configured to sense when a coin is deposited into the storage compartment, the coin sensor connected to the electronics; and
programming in the electronics configured to display a representation of an activity on the display screen based upon a location of the movable icon sensed by the switch.

2. The electronic banking toy of claim 1 wherein the programming is configured to monitor an account.

3. The electronic banking toy of claim 2 wherein the programming assigns a random value to each deposited coin detected by the coin sensor and the assigned amount is added to the account and an amount is deducted when an activity is depicted on the display screen.

4. The electronic banking toy of claim 1 further comprising a drawer disposed in housing for storing deposited coins.

5. The electronic banking toy of claim 1 further comprising a remote control having one or more input buttons connected to the electronics.

6. The electronic banking toy of claim 5 wherein the one or more input buttons control functions of the representations of activities depicted on the display screen.

7. The electronic banking toy of claim 1 further comprising one or more speakers connected to the electronics and configured to provide audio in conjunction with the graphical representation of an activity.

8. The electronic banking toy of claim 1 wherein the one or more physical icons integrally formed on the housing resemble locations.

9. The electronic banking toy of claim 8 wherein the representation of an activity depicted on the display screen relates to the representation of a location associated with the location of the movable icon sensed by the switch.

10. An electronic banking toy comprising:
a housing defining an interior storage compartment with an adjoining slot;
one or more physical icons integrally formed on the housing;
electronics including a processor and memory stored within the housing;
a track formed in the housing adjacent the one or more physical icons, the track including a switch associated with at least one of the physical icons, the switch connected to the electronics;
a movable icon slidably coupled to the housing via the track such that the position of the movable icon along the track is sensed by the switch;
a display screen mounted on the housing and connected to the electronics;
a coin sensor adjacent the slot and connected to the electronics, the coin sensor configured to indicate to the electronics when a coin has been deposited into the housing; and
software comprising executable instructions stored in the memory, wherein the processor executes the instructions to depict on the display screen one or more graphical representations of activities;
wherein the software assigns a random value to each deposited coin detected by the coin sensor and the assigned amount is added to a account.

11. The electronic banking toy of claim 10 wherein software is configured to monitor an account balance.

12. The electronic banking toy of claim 11 wherein each representation of an activity has an assigned cost and the software is configured to add the random value assigned to each deposited coin and deduct the cost of each representation of an activity.

13. The electronic banking toy of claim 10 further comprising a drawer disposed within housing for storing deposited coins.

14. The electronic banking toy of claim 10 further comprising a remote control having one or more input buttons connected to the electronics.

15. The electronic banking toy of claim 14 wherein the one or more input buttons control functions of the representations of activities depicted on the display screen.

16. The electronic banking toy of claim 10 further comprising one or more speakers connected to the electronics and configured to provide audio in conjunction with the graphical representation of an activity.

17. An electronic banking toy comprising:
a housing defining a storage compartment and an adjoining slot;
a coin sensor disposed within the housing adjacent the slot and configured to provide a corresponding sensor output;
a drawer disposed within the housing for storing deposited coins;
one or more physical icons integrally formed on the housing;
a track formed in the housing adjacent the physical icons;
a movable icon coupled to the housing and movable along the track;
a switch disposed in the track and associated with one or more of the physical icons configured to sense when the icon is proximate to the physical icon and provide a corresponding switch output;
a display screen mounted to the housing configured to display graphical representations of activities; and
a controller configured to receive the switch output and select a graphical representation from a library of graphical representations for display on the display screen based upon the location of the movable icon sensed by the switch.

18. The electronic banking toy of claim 17 wherein the controller is configured to monitor an account.

19. The electronic banking toy of claim 18 wherein the controller is configured to receive sensor output, assigns a value to each deposited coin sensed by coin sensor, and adds the assigned amount to the account and each representation of an activity has a cost that is deducted from the account when displayed on the display screen.

20. The electronic banking toy of claim 17 further comprising a remote control having one or more input buttons connected to the electronics.

21. The electronic banking toy of claim 20 wherein the one or more input buttons control functions of the representations of activities depicted on the display screen.

22. The electronic banking toy of claim 17 further comprising one or more speakers connected to the electronics and configured to provide audio in conjunction with the graphical representation of an activity.

23. A method of saving money in an electronic banking toy comprising:
receiving a coin in a housing defining an interior storage compartment for coins, the housing including a track;
assigning the coin a value;
adding the value assigned to the coin to an account;
sensing the location of an icon coupled to the toy, the icon being moveable along the track;
displaying graphical representations of an activity on a display screen based upon the location of the icon; and
deducting an amount from the account when the graphical representations are displayed.

24. The method of claim 23 wherein displaying a graphical representation of an activity includes providing an interactive game.

25. The method of claim 24 further comprising receiving one or more inputs to control functions of the graphical representation of an activity.

26. The method of claim 23 wherein displaying a graphical representation of an activity includes buying virtual items.

27. The method of claim 23 further comprising resetting the account balance when received coins are removed from the toy.

28. The method of claim 23 wherein displaying a graphical representation of an activity includes providing a code for use in conjunction with a website associated with the toy.

29. The method of claim 23 further comprising playing an audio clip in conjunction with the graphical representations.

* * * * *